US008622463B2

(12) United States Patent
Schaefer (10) Patent No.: US 8,622,463 B2
(45) Date of Patent: Jan. 7, 2014

(54) FRONT REGION OF A VEHICLE AND VEHICLE

(75) Inventor: Joachim Schaefer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 13/338,297

(22) Filed: Dec. 28, 2011

(65) Prior Publication Data

US 2012/0161473 A1 Jun. 28, 2012

(30) Foreign Application Priority Data

Dec. 28, 2010 (DE) .......................... 10 2010 056 390

(51) Int. Cl.
*B60R 21/34* (2011.01)
(52) U.S. Cl.
USPC .................. 296/187.04; 296/187.09; 293/132
(58) Field of Classification Search
USPC ............. 296/187.04, 187.09, 193.09, 203.02; 293/108, 109, 115, 132, 135–137; 180/274
See application file for complete search history.

(56) References Cited

U.S. PATENT DOCUMENTS

| | | | |
|---|---|---|---|
| 6,460,909 B2 * | 10/2002 | Mansoor et al. ............... | 293/120 |
| 6,467,822 B1 | 10/2002 | Leng | |
| 6,513,843 B1 * | 2/2003 | Frederick et al. ............... | 293/36 |
| 6,832,795 B2 * | 12/2004 | Bastien et al. ................. | 293/120 |
| 7,013,951 B2 * | 3/2006 | Bauer et al. ...................... | 165/41 |
| 7,192,068 B1 * | 3/2007 | Kim ............................... | 293/133 |
| 7,354,030 B2 | 4/2008 | Murayama et al. | |
| 7,481,484 B2 * | 1/2009 | Hirano ..................... | 296/187.04 |
| 7,575,259 B2 | 8/2009 | Hasegawa | |
| 7,575,271 B2 * | 8/2009 | Hasegawa et al. ........ | 296/187.04 |
| 7,854,453 B2 * | 12/2010 | Tanabe .......................... | 293/102 |
| 8,033,356 B2 * | 10/2011 | Kim ............................. | 180/271 |
| 8,128,153 B2 * | 3/2012 | Bernt et al. .............. | 296/187.04 |
| 8,132,851 B2 * | 3/2012 | Steller et al. ............. | 296/187.04 |
| 8,157,046 B2 * | 4/2012 | Tanabe .......................... | 180/274 |
| 2002/0101085 A1 * | 8/2002 | Gehringhoff et al. ......... | 293/120 |

(Continued)

FOREIGN PATENT DOCUMENTS

DE 10304784 A1 9/2003
DE 60017697 T2 12/2005

(Continued)

OTHER PUBLICATIONS

German Patent Office, German Search Report for Application No. 102010056390.0, dated Jul. 25, 2011.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A front region of a vehicle is provided that includes, but is not limited to an upper front region, a middle front region, and a lower front region. The upper front region includes, but is not limited to an engine hood, front regions of mudguards headlamps or driving direction indicators. The middle front region includes, but is not limited to an impact energy-absorbing region and has molding elements in driving direction. The molding elements interact with impact energy-absorbing, yielding structures. The yielding structures are plastically deformable. The lower front region includes, but is not limited to a molding apron. The lower front region is elastically deformable.

14 Claims, 7 Drawing Sheets

(56) References Cited

U.S. PATENT DOCUMENTS

| | | |
|---|---|---|
| 2002/0129981 A1 | 9/2002 | Satou |
| 2004/0160071 A1* | 8/2004 | Suganuma et al. ........... 293/132 |
| 2005/0280268 A1 | 12/2005 | Dehn et al. |
| 2007/0182172 A1* | 8/2007 | Hasegawa .................... 293/102 |
| 2009/0160203 A1 | 6/2009 | Garg et al. |
| 2009/0267364 A1* | 10/2009 | Crainic et al. ............... 293/117 |
| 2009/0289471 A1* | 11/2009 | Finney .................... 296/187.04 |
| 2011/0175379 A1 | 7/2011 | Erzgraeber et al. |
| 2012/0161473 A1* | 6/2012 | Schaefer ................. 296/187.09 |

FOREIGN PATENT DOCUMENTS

| | | |
|---|---|---|
| DE | 60107570 T2 | 12/2005 |
| DE | 102004027169 A1 | 12/2005 |
| DE | 102005008637 A1 | 8/2006 |
| DE | 102006000481 A1 | 4/2007 |
| DE | 102005059447 A1 | 6/2007 |
| DE | 102008013815 A1 | 9/2008 |
| DE | 102009004496 A1 | 7/2010 |
| EP | 1384629 A2 | 1/2004 |
| EP | 1816036 A1 | 8/2007 |
| EP | 1867526 A2 | 12/2007 |

OTHER PUBLICATIONS

UK IPO, British Search Report for Application No. 1119551.8, dated Feb. 29, 2012.

* cited by examiner

FRONT REGION OF A VEHICLE AND VEHICLE

CROSS-REFERENCE TO RELATED APPLICATION

This application claims priority to German Patent Application No.102010056390.0, filed Dec. 28, 2010, which is incorporated herein by reference in its entirety.

TECHNICAL FIELD

The technical field relates to a front region of a vehicle and a vehicle.

BACKGROUND

From publication U.S. Pat. No. 6,467,822 B1, a vehicle with an energy-absorbing structure having a spoiler is known in this regard. The spoiler is produced of one piece with the bumper or fixed on the bumper. To improve the protection of pedestrians, this spoiler is limited in its yield along the vehicle by a support, which is fixed on the vehicle. The support is fixed at a radial distance behind the spoiler. The spoiler is arranged below a front radiator block, while the energy-absorbing structure is arranged upstream of a front radiator block in a middle region of the front radiator block in driving direction.

This front region of a vehicle was specially designed in order to protect pedestrians. A front region designed thus however cannot prevent that initially the foot region of a pedestrian in the event of a collision is struck by the spoiler in the lower front region and possibly trapped between spoiler and road surface. In the process, a high loading of the longitudinal and cruciate ligaments of the knee joint can occur in the knee joint when the upper body topples over in the direction of the engine hood and in addition, an extreme angling-off of the knee occurs. This was established in a plurality of comparative tests using an artificial leg structure having the appropriate measuring devices in the ligament regions of the knee and in an angling-off region of the knee as well as in the lower leg and in the thigh.

At least one object is to reduce the loads on the knee in the event of collision accidents involving pedestrians and to create a catching region of a vehicle that more greatly protects the knee of a pedestrian in the event of a collision accident. In addition, other objects, desirable features, and characteristics will become apparent from the subsequent summary and detailed description, and the appended claims, taken in conjunction with the accompanying drawings and this background.

SUMMARY

In an embodiment, a front region of a vehicle is described, which comprises an upper front region, a middle front region, and a lower front region. The upper front region comprises an engine hood, front regions of mudguards, headlamps, or driving direction indicators. The middle front region comprises an impact energy-absorbing region and has molding elements in driving direction. The molding elements interact with energy absorbing, yielding structures. The yielding structures are plastically deformable. The lower front region comprises a molding apron and is elastically deformable.

This front region of a vehicle has the advantage that because of the elastic deformability of the lower front region the lower leg and the foot of a pedestrian, which in the event of a collision initially collides with the lower front region is sprung back into a more favorable position for the loading of the knee with the same force with which this region of a leg impacts. Following an elastic deformation, the deformed components of the lower front region directly spring back into their original shape and by doing so prevent both the stretching of the lateral ligaments of the knee as well as the angling-off of the knee. The molding elements are preferably arranged upstream of an upper region of a front radiator block in driving direction.

In an embodiment, the molding apron covers a lower region of the front radiator block and is arranged below the front radiator block. The lower front region is preferably held free of components that are not elastically deformable, in particular their intake manifolds, radiator grille and fog lamps. Thus, it is ensured that upon a front-end traffic accident only the provided molding apron, which interacts spring-elastically deformable with the vehicle underbody, is arranged in the lower front region and no interfering components that are not elastically deformable can be found in this region any longer.

In an embodiment, the molding apron comprises an elastic material and is to the middle impact energy-absorbing front region fixed transversely to the driving direction. The lower marginal region of the molding apron, however, is arranged freely suspended, so that the elastic deformability of the elastic material of the molding apron can come into full effect. The foot and lower leg region of a pedestrian is resiliently pivoted away by the freely suspended and elastically deformable material of the molding apron with the same force in driving direction so that the load is taken off the knee joint.

In an embodiment, it is additionally provided that the molding apron comprises an elastic material and supports itself elastically on the vehicle underbody. In this case, the molding apron with its lower edge is not only freely suspended, but additionally comprises elastic components with which the molding apron is elastically supported on the vehicle underbody. These elastic elements can be designed very differently. In an embodiment, elastically resilient elements are arranged between the molding apron and the vehicle underbody. These resilient elements can be leaf springs that are pre-bent U-shaped, spring clips or even helical springs, which on one side are fastened to the lower margin of the vehicle apron and with a second end hinged on the vehicle underbody.

In an embodiment, the vehicle underbody comprises a cross member and an energy-absorbing crash box towards the molding apron. The elastically resilient elements are arranged upstream of the crash boxes in driving direction. This has the advantage that pedestrians are protected from major injuries in the event of head-on collisions and in the case of major collision accidents with objects and with correspondingly higher speed the impact energy-absorbing crash boxes become active after the elastically resilient elements before further units such as a front radiator block and others are impaired or damaged through the head-on accident.

In addition, it is provided in an embodiment that between the molding apron and the vehicle underbody rubber-elastic buffers with hollow profiles are arranged. Such rubber-elastic buffers are particularly suited since these are extremely yielding and yet regain their original shape extremely rapidly. This rapid regaining helps reduce overloading of the knee joint. It is possible, in addition, to arrange buffers of rubber-elastic foams between the molding apron and the vehicle underbody. Such foam rubber components can be produced in relatively any shape and adapted to the shape of the molding apron as well as to the structural requirements of the vehicle underbody.

In an embodiment, an elongated rubber-elastic buffer is arranged between the molding apron and the vehicle underbody transversely to the driving direction with a hollow profile. Such an elongated rubber-elastic buffer in the shape of a rubber hose has the advantage that there are no intermediate spaces that are not cushioned by the rubber-elastic element. In addition, it is also possible here to arrange an elongated buffer instead of the hollow profile, which comprises rubber-elastic foam or a foam rubber strand.

Instead of these merely resilient solutions, a hose-shaped airbag is arranged in a further embodiment on the lower margin of the molding apron transversely to the driving direction. Such an airbag has the advantage that it not only resiliently accelerates ankles and lower leg of a pedestrian in driving direction, but that moreover it can angle-off the lower leg and foot region of the pedestrian even further in driving direction, so that the angling-off of the knee joint and the ligament stretching of the knee joint are reduced.

A vehicle is provided with a front region according to any one of the mentioned embodiments. The vehicle has the advantages as per the application already mentioned in connection with the front region, which are not mentioned again at this point to avoid repetitions. The vehicle can be a passenger car with a combustion engine and/or with an electric motor.

BRIEF DESCRIPTION OF THE DRAWINGS

The present invention will hereinafter be described in conjunction with the following figures, wherein like numerals denote like elements, and.

DETAILED DESCRIPTION

The following detailed description is merely exemplary in nature and is not intended to limit application and uses. Furthermore, there is no intention to be bound by any theory presented in the receding background or summary or the following detailed description.

Figure 1:
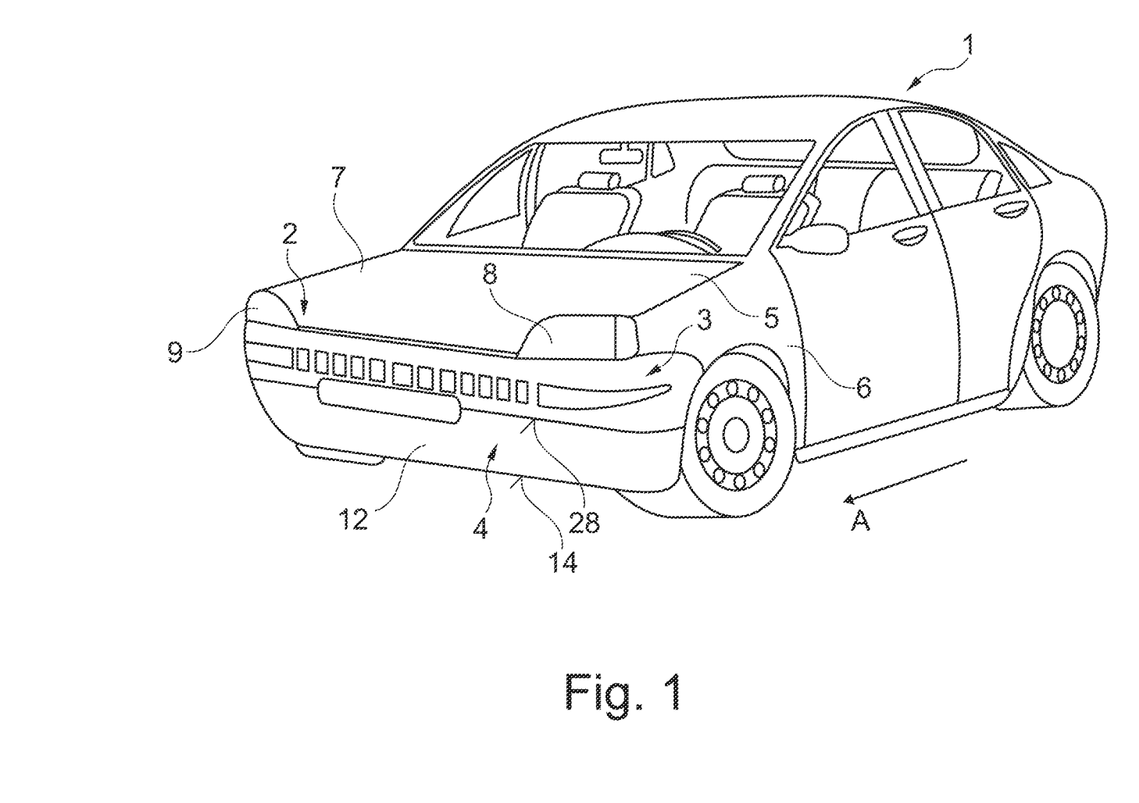
FIG. 1 shows a schematic perspective representation of a front region of a vehicle according to an embodiment.

FIG. 1 shows a schematic perspective representation of a front region of a vehicle 1 in the shape of a passenger car according to an embodiment. The front region of this vehicle 1 comprises an upper front region 2, a middle front region 3, and a lower front region 4. The upper front region 2 comprises an engine hood 5 and front regions of mudguards 6 and 7 as well as headlamps 8 and 9. The middle front region 3 comprises an impact energy-absorbing region shown in the following figures and has molding elements in driving direction A, such as for example a radiator grille, which cover the impact energy-absorbing region.

Such molding elements interact with the impact energy-absorbing, yielding structures and in the embodiment shown are arranged upstream of a front region of a front radiator block in driving direction A, as is shown by the following Figures. The yielding, impact energy-absorbing structures are plastically deformable in this middle region. The lower front region 4 comprises a molding apron 12, which, in the embodiment shown, covers a lower region of the front radiator block and is additionally arranged below the front radiator block. The molding apron 12 interacts with a vehicle underbody in an elastically deformable manner in driving direction A, as is shown by the following Figures.

Figure 2:
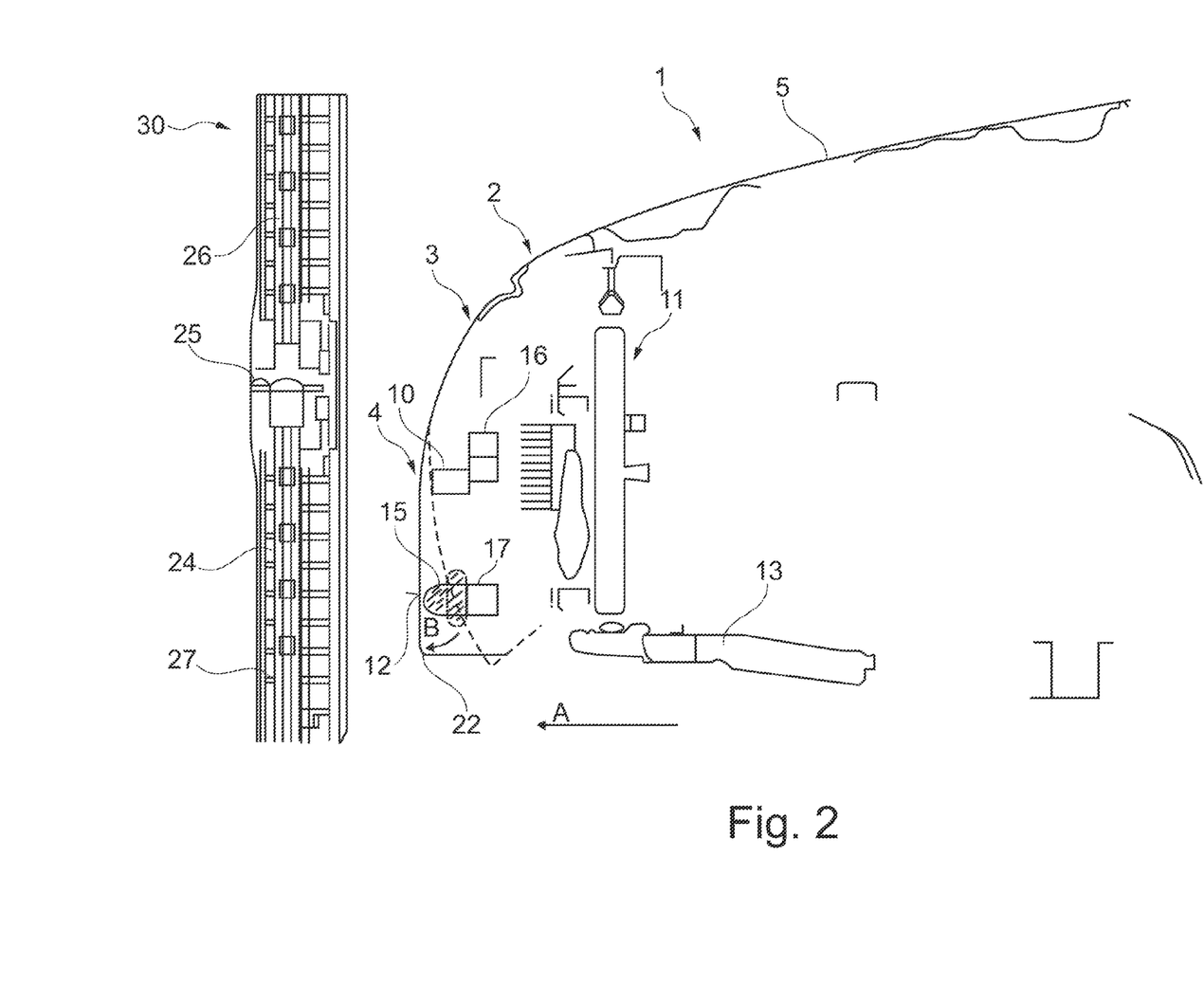
FIG. 2 shows a schematic diagram of the front region of the vehicle according to FIG. 1 before a collision with a pedestrian.

FIG. 2 shows a schematic diagram of the front region of the vehicle 1 according to FIG. 1 before a collision with a pedestrian. Here, a flexible test leg 30 of the pedestrian is shown with measuring points in the foot region 27, in the lower leg region 24, in the knee joint region 25 and in the thigh region 26. With the help of these measuring points, a loading during the angling-off of the foot region 27 as well as an angling-off between lower leg region 24 and thigh region 26 of the knee joint region 25 can be recorded and ultimately, beyond this, instances of ligament stretching, particularly of the lateral ligaments in the knee joint region 25, can be recorded upon a collision with a front region of the vehicle 1.

During such impact tests with the test leg 30 it has been shown that there is the risk that the foot region 27 is trapped in the lower front region during the impact, causing overstretching of the lateral ligaments of the knee joint region 25 and overloading the knee joint region, particularly the lateral ligaments, through excessive angling-off in the knee joint region 25. With FIG. 2, a vehicle front region of the vehicle 1 is now shown, wherein an impact energy-absorbing structure 10, which is plastically deformable and thus removes impact energy, is arranged upstream of a cross member 16 in driving direction A.

In the lower front region 4 a crash box 17 of a vehicle substructure 13 and a resilient element 15 are arranged in driving direction A. In the lower front region 4, a molding apron 12 interacts with the resilient element 15, which, as shown by the interrupted lines, is initially preloaded by the lower leg region 24 and the foot region 27 during a collision. However, allows the molding apron 12 to spring-elastically swing back in arrow direction B, so that the foot region 27 and the lower leg region 24 of the molding apron 12 with the resilient force cannot only enter to a limited degree, but are timely thrown back again. Thus, taking the load off the knee join region 25 and preventing a bending over of the ankles in the foot region 27. Such resilient elements, which are arranged upstream of the crash boxes 17, can be arranged distributed in the lower front region 4 of the vehicle transversely to the driving direction.

Instead of crash boxes 17, which by themselves are energy absorbing and plastically deformed during major impact forces and remove impact energy in the process, a lower cross member, which is in connection with the vehicle underbody 13, can hold the resilient elements for elastic yielding of the molding apron in the lower front region. The molding apron 12 covers a lower region of the front radiator block 11 and also extends below the front radiator block 11, in order to cover or screen the vehicle underbody 13.

Figure 3:
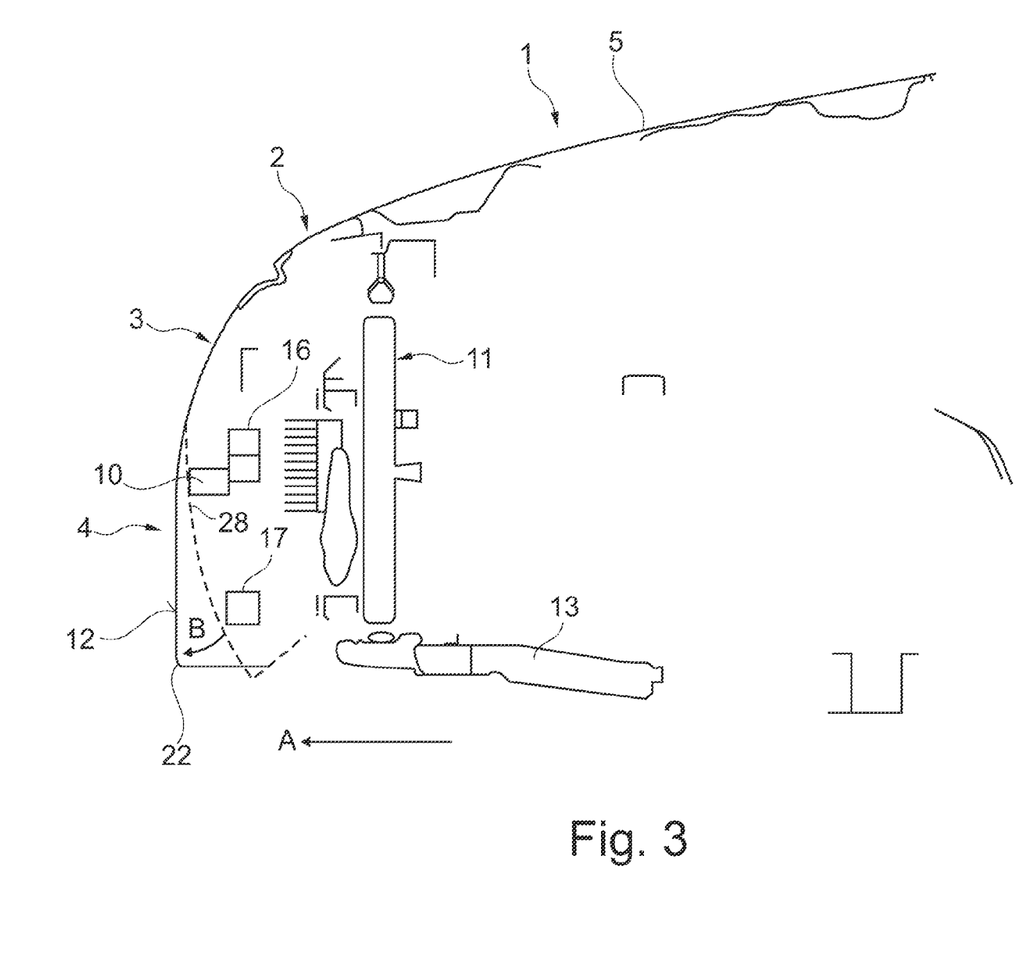
FIG. 3 shows a schematic diagram of the front region of the vehicle according to FIG. 1 with a molding apron of elastic material.

FIG. 3 shows a schematic diagram of the front region of the vehicle 1 according to FIG. 1 with a molding apron 12 of elastic material. In this case, the molding apron 12 is fixed on a lower edge 28 of the middle front region 3 and is freely suspended subject to the covering of the lower region of the front radiator block 11 and of the vehicle underbody 13. Because of the elastic properties of the separating apron 12 in the lower front region in the event of an impact of a lower leg and foot region of a pedestrian, said front region will swing back in the arrow direction B with the same force with which the pedestrian has impacted the lower region with the elastic molding apron.

Figure 4:
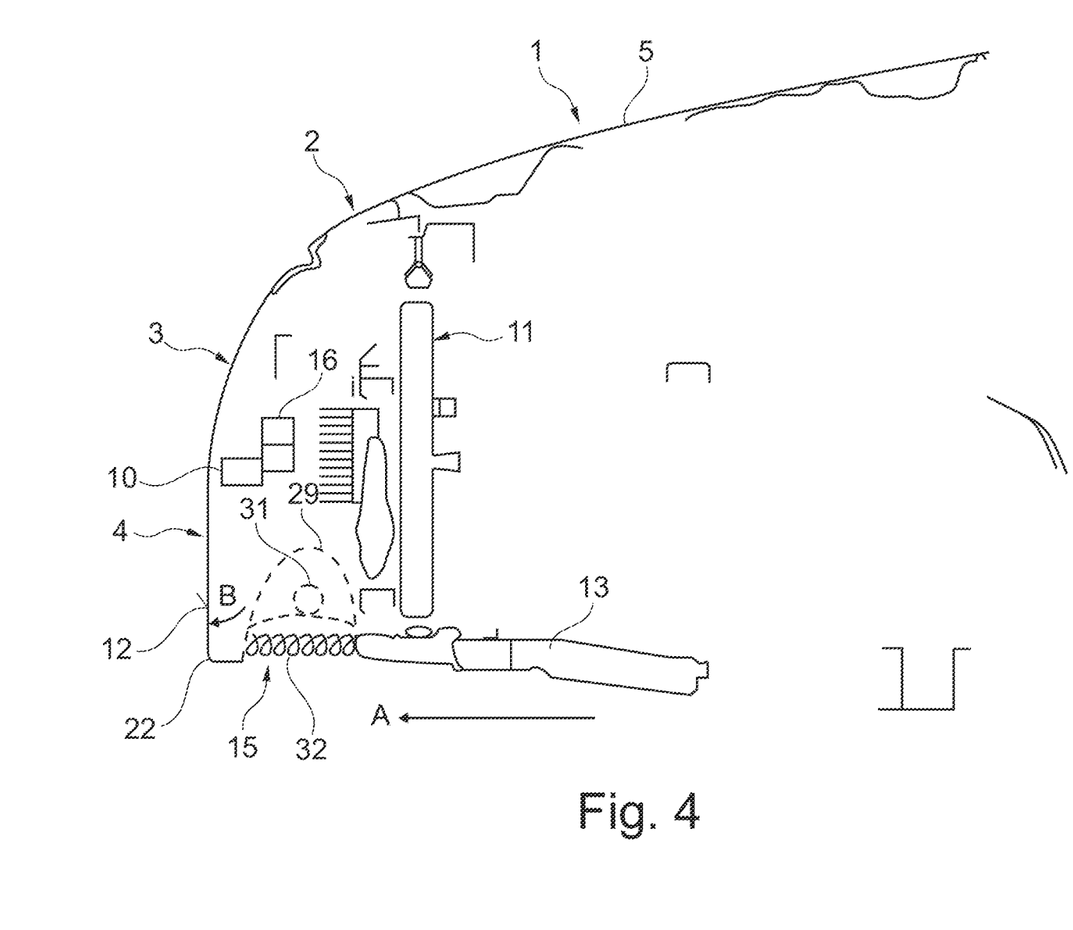
FIG. 4 shows a schematic diagram of the front region of the vehicle according to FIG. 1 with additional resilient elements.

FIG. 4 shows a schematic diagram of the front region of the vehicle 1 according to FIG. 1 with different additional resilient elements in the lower front region 4, which can be arranged between the lower edge 22 and the vehicle underbody 13. For example, this can be a leaf spring 29 bent U-shaped or a spring clip 31 or a helical spring 32, which support the lower edge 22 of the molding apron 12 at a plurality of points transversely to the driving direction.

Figure 5:
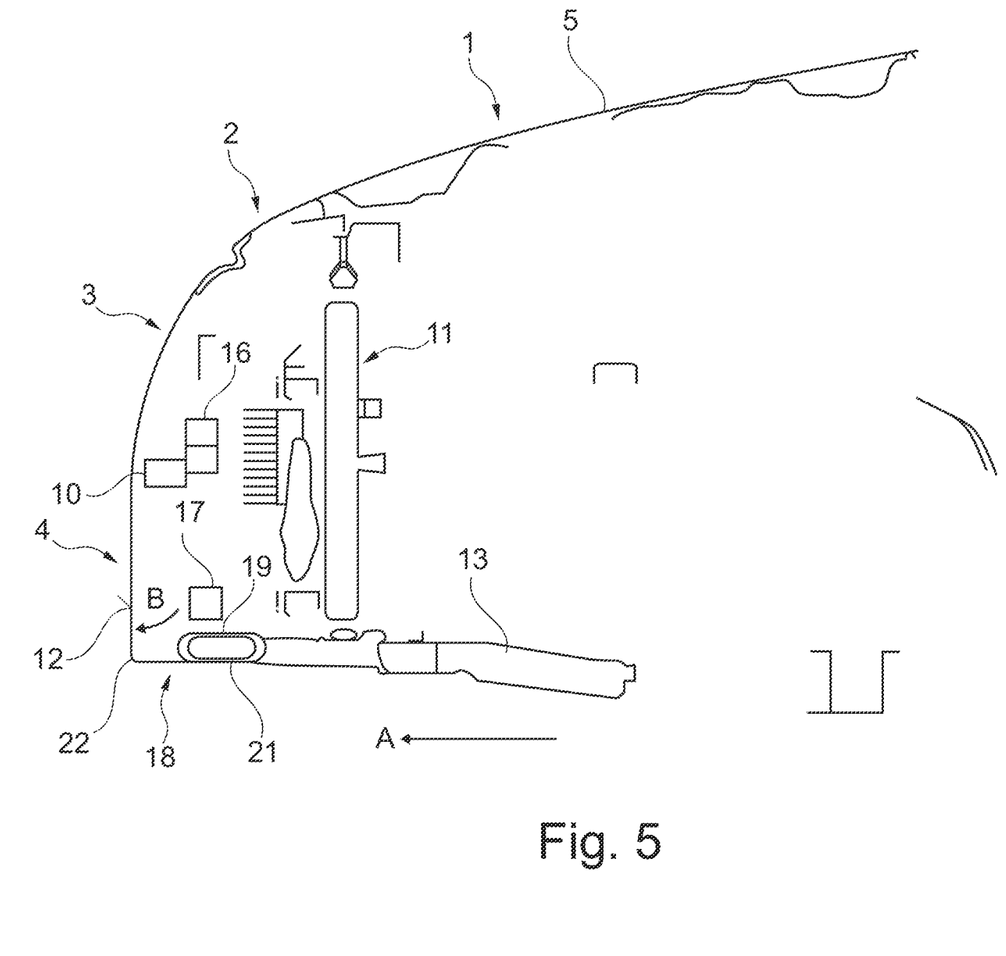
FIG. 5 shows a schematic diagram of the front region of the vehicle according to FIG. 1 with an additional rubber-elastic hollow profile.

FIG. 5 shows a schematic diagram of the front region of the vehicle 1 according to FIG. 1 with an additional buffer 18, which has a rubber-elastic hollow profile 19, which is either arranged at individual points, transversely to the driving direction, between the lower edge 22 of the molding apron 12 and the vehicle underbody 13 or is provided as elongated rubber-elastic hose 21 along the lower edge 22 of the molding apron 12. Here, the cross section of the rubber-elastic hollow profile 19 is oval.

Figure 6:
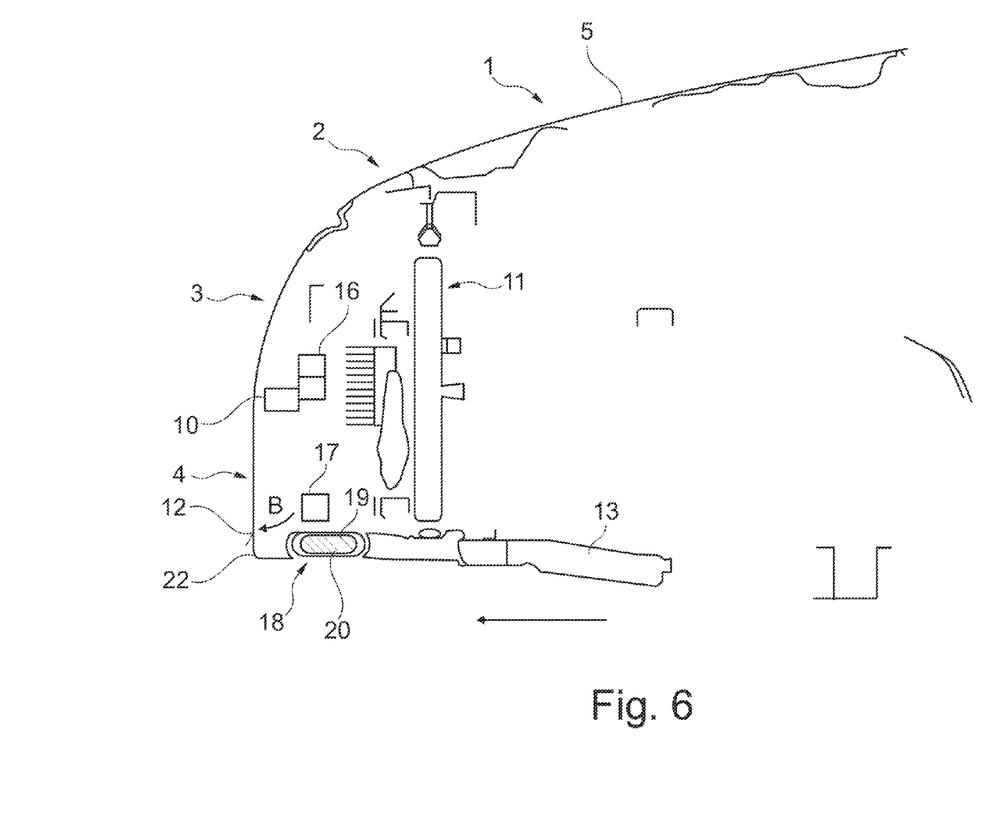
FIG. 6 shows a schematic diagram of the front region of the vehicle according to FIG. 1 with an additional element of a foam rubber.

FIG. 6 shows a schematic diagram of the front region of the vehicle 1 according to FIG. 1 with an additional elastic element of a rubber-elastic foam rubber 20. This element of foam rubber 20 can be oval shaped similar to the rubber-elastic hollow profile that is shown in FIG. 5. The foam rubber material is marked in FIG. 6 by a corresponding hatch.

Figure 7:
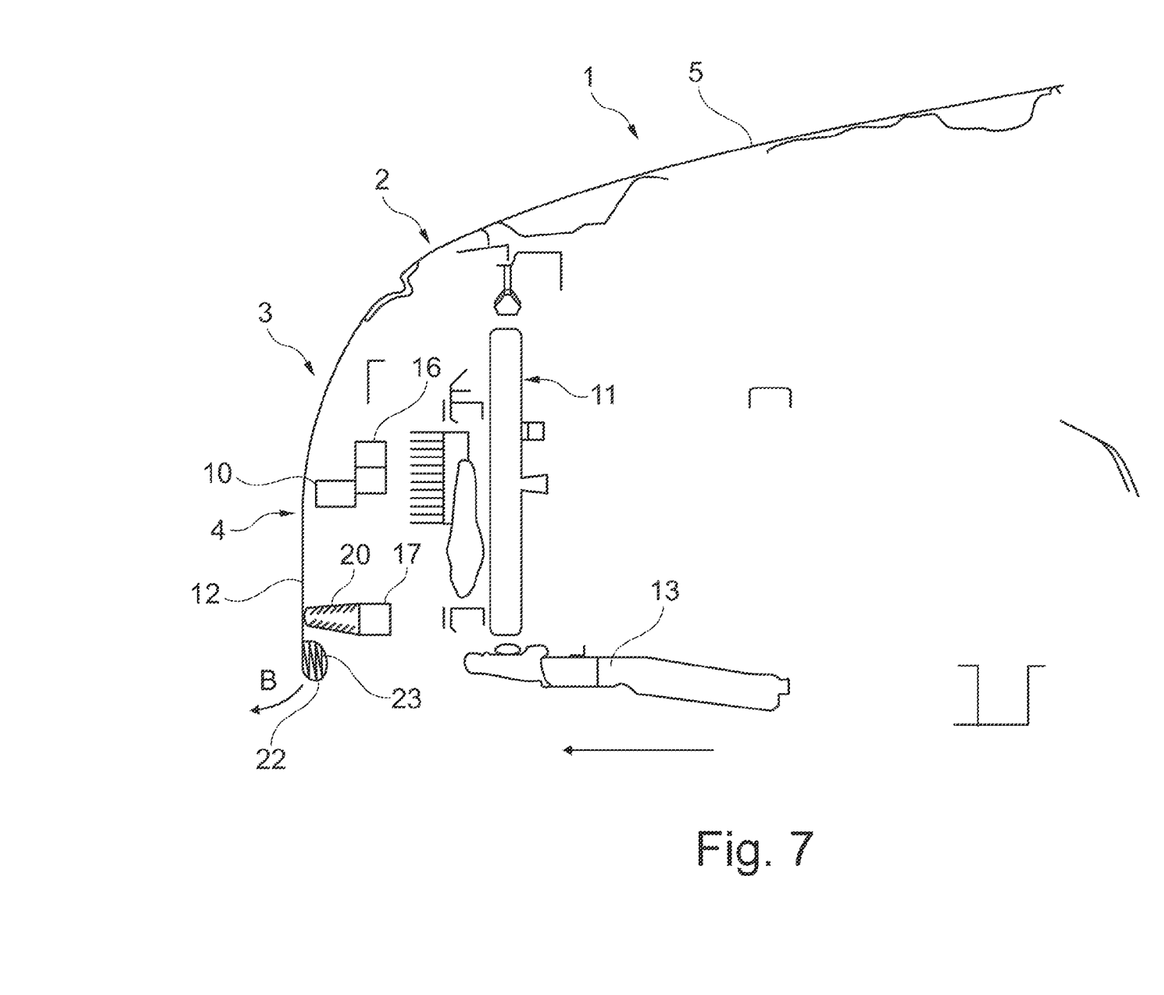
FIG. 7 shows a schematic diagram of the front region of the vehicle according to FIG. 1 with an additional airbag.

FIG. 7 shows a schematic diagram of the front region of the vehicle 1 according to FIG. 1 with an additional airbag 23 on the lower edge 22 of the molding apron 12 of the lower front region 4. Above an elongated airbag 23, along the lower edge 22 of the molding apron 12, an element of elastic foam rubber 20 is additionally arranged upstream in driving direction A, which for example is fixed to crash boxes 17 in the lower front region 4 of the vehicle 1. In the event of a collision with a pedestrian not only an elastic resetting force, but additionally a pivoting-out of the airbag 23 in arrow direction B occurs, which effectively protects the ankles of the pedestrian.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing form the scope as set forth in the appended claims and their legal equivalents.

What is claimed is:

1. A front region of a vehicle, comprising:
an upper front region an engine hood, front regions of mudguards, headlamps, or driving direction indicators;
a middle front region is configured as an impact energy-absorbing region and comprises molding elements in a driving direction that interact with impact energy-absorbing, yielding structures and the impact energy-absorbing, yielding structures are plastically deformable; and
a lower front region that is elastically deformable and comprises a molding apron,
wherein the molding apron comprises an elastic material that is elastically supported on a vehicle underbody, and rubber-elastic buffers with hollow profiles are arranged between the molding apron and the vehicle underbody.

2. The front region according to claim 1, wherein the molding elements are arranged upstream of the front region of a front radiator block in the driving direction.

3. The front region according to claim 2, wherein the molding apron is configured to cover a lower region of the front radiator block and arranged below the front radiator block.

4. The front region according to claim 1, wherein the lower front region is substantially free of components that are not elastically deformable.

5. The front region according to claim 4, wherein the components that are not elastically deformable are air intake manifolds, radiator grille and fog headlamps.

6. The front region according to claim 4, wherein the components that are not elastically deformable is a radiator grille.

7. The front region according to claim 4, wherein the components that are not elastically deformable are fog headlamps.

8. The front region according to claim 1, wherein the molding apron comprises an elastic material and fixed to the middle impact energy-absorbing front region transversely to the driving direction and with a lower edge arranged in a freely suspended manner.

9. The front region according to claim 1, wherein elastically resilient elements are arranged between the molding apron and the vehicle underbody.

10. The front region according to claim 9,
wherein the vehicle underbody towards the molding apron comprises a cross member and energy-absorbing crash boxes, and
wherein the elastically resilient elements are arranged upstream of the crash boxes in the driving direction.

11. The front region according to claim 1, buffers of rubber-elastic foams are arranged wherein between the molding apron and the vehicle underbody.

12. The front region according to claim 1, wherein an elongated buffer is arranged between the molding apron and the vehicle underbody, which comprises a rubber-elastic foam.

13. A front region of a vehicle, comprising:
an upper front region an engine hood, front regions of mudguards, headlamps, or driving direction indicators;
a middle front region is configured as an impact energy-absorbing region and comprises molding elements in a driving direction that interact with impact energy-absorbing, yielding structures and the impact energy-absorbing, yielding structures are plastically deformable; and
a lower front region that is elastically deformable and comprises a molding apron,
wherein the molding apron comprises an elastic material that is elastically supported on a vehicle underbody, and an elongated and rubber-elastic hose is arranged between the molding apron and the vehicle underbody and transversely to the driving direction with a hollow profile.

14. A front region of a vehicle, comprising:
an upper front region an engine hood, front regions of mudguards, headlamps, or driving direction indicators;
a middle front region is configured as an impact energy-absorbing region and comprises molding elements in a driving direction that interact with impact energy-absorbing, yielding structures and the impact energy-absorbing, yielding structures are plastically deformable; and a lower front region that is elastically deformable and comprises a molding apron, wherein a hose-shaped airbag is arranged transversely to the driving direction on a lower edge of the molding apron.

* * * * *